United States Patent [19]

Klotz

[11] 4,162,215
[45] Jul. 24, 1979

[54] DISPLACEMENT OF A LIQUID A BY A LIQUID B IN A SUSPENSION

[75] Inventor: Günther Klotz, Berg.-Gladbach, Fed. Rep. of Germany

[73] Assignee: Bayer Aktiengesellschaft, Leverkusen, Fed. Rep. of Germany

[21] Appl. No.: 800,813

[22] Filed: May 26, 1977

[30] Foreign Application Priority Data

Jun. 18, 1976 [DE] Fed. Rep. of Germany ....... 2627333

[51] Int. Cl.² ................ B01D 11/00; D21C 9/02; B06B 3/02; B06B 5/14
[52] U.S. Cl. .................................. 210/21; 162/60; 68/181 R; 8/156
[58] Field of Search .............. 210/21, 511; 162/150, 162/60, 17, 76, 95, 261; 68/181 R; 23/267 E, 267 F, 270 R; 8/156

[56] References Cited

U.S. PATENT DOCUMENTS

| 2,022,654 | 12/1935 | Dreyfus | 162/76 |
| 2,431,478 | 11/1947 | Hill | 162/17 |
| 3,258,390 | 6/1966 | Tomlinson II | 162/17 |
| 3,593,536 | 7/1971 | Lafay | 62/58 |
| 3,837,812 | 9/1974 | Boontje | 23/273 R |

FOREIGN PATENT DOCUMENTS

| 544608 | 2/1953 | Canada | 162/60 |
| 271524 | 3/1928 | United Kingdom | 162/76 |

OTHER PUBLICATIONS

Chemical Engineers' Handbook, R. H. Perry and C. H. Chilton, McGraw Hill Book Company, 5th. Edition, 1973, p. 19-42, FIGS. 19-63.
Chemical Engineers' Handbook, 5th. Edition, Robert H. Perry, McGraw-Hill Book Company, New York, 1973, pp. 16-47 and 48.

Primary Examiner—Charles N. Hart
Assistant Examiner—David R. Sadowski
Attorney, Agent, or Firm—Sprung, Felfe, Horn, Lynch & Kramer

[57] ABSTRACT

This invention relates to a process in which a liquid A is displaced by a liquid B in a suspension. This is effected by superimposing a liquid column on an exchange chamber through which the liquids flow in countercurrent, with stirring. The process may be used for washing or acidifying suspensions, particularly cotton linters.

8 Claims, 1 Drawing Figure

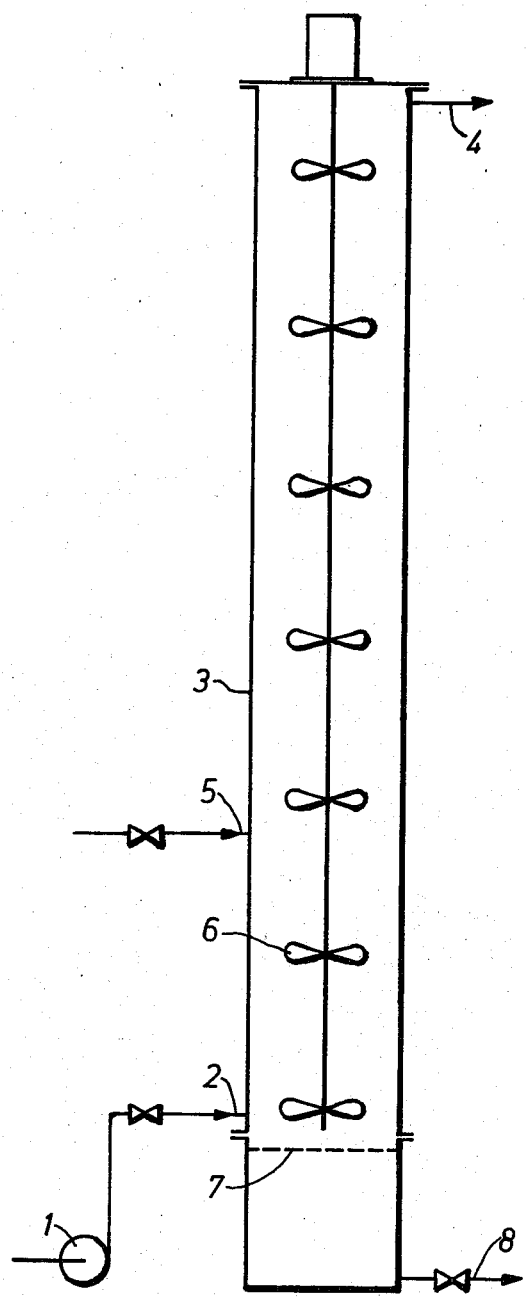

DISPLACEMENT OF A LIQUID A BY A LIQUID B IN A SUSPENSION

This invention relates to a process for the continuous displacement of a liquid A by a liquid B in a suspension.

It is often necessary in practice to displace liquids from a suspension, either in order to clean the suspension or to wash the product out of a solid or to replace one liquid by another required for the next stage of the process. In multistage cellulose bleaching processes, vigorous washing is carried out between each bleach. In the preparation of pharmaceuticals, the active substance is often washed out with a solvent. The washing or extraction of contaminated catalysts is another well-known problem found in many chemical processes.

Discontinuously operating washing processes with very high water consumption and long occupancy times or solid/liquid extraction processes involving great expenditure in apparatus that have hitherto been employed for these purposes.

For the working up of cellulose, for example, so-called hollanders are used as bleach containers, which are also used for washing after bleaching. The water is removed through perforated cylinders which dip into the stream of cellulose. This technology goes back to the very beginnings of cellulose manufacture.

One serious disadvantage of this washing process is that towards the end of the process, the wash water contains only small quantities of impurities, so that a very large quantity of water must be used to remove the remaining impurities. Apart from the excessive water consumption, the long cleaning times and hence along residence time in the apparatus is also a disadvantage.

Another method of dewatering cellulose is that of Rauma-Repola. In this process, the suspension flows continuously through a plurality of filter cells arranged in series, each one of which is again subdivided into several washing zones.

Since each stage requires one filter cell, the capital costs are high. Although the consumption of water can be reduced by returning the wash water, this saving is to a large extent cancelled out by the complex circulating system required.

Another method for the dehydration of cellulose linked with a washing process consists of treating cellulose on a Fourdrinier wire of the kind used in paper manufacture. An improvement of this process was obtained by introducing a screen roller instead of the usual felt roller.

This method again is not simple in its use of apparatus and also requires large quantities of wash water. Moreover, the wash water cannot be vigorously mixed with the cellulose in this process, so that the washing effect is reduced. The washing process can only be carried out in this apparatus if the pulp is at the same time thickened.

Other bleaching and washing processes operate with so-called diffusers. In these apparatus, the soiled water is replaced by wash water which is injected from a spray ring.

One disadvantage of these diffusers is that they are very liable to get blocked. Since there is no thorough mixing of the substances, only slight exchange takes place and the water consumption is therefore high.

It is an object of the present invention to provide a process by which cleaning of the solid particles of a liquid and/or substitution of the liquid of a suspension having a solid content of from 0.5 to 20% can be carried out efficiently and economically in a continuous operation.

According to the present invention, there is provided a process for the displacement of a liquid A by a liquid B in a suspension having a solids content of from 0.5 to 20% which ascends a suspension column while being stirred, the liquid B entering the column at a point above the inlet for the suspension, but in the lower half of the column, the liquid A being discharged from the column from an outlet below the inlet for the suspension, and a screen being arranged between the inlet for the suspension, and the outlet for liquid A.

There is also provided an apparatus for carrying out the process, comprising a suspension column having a diameter/height ratio of from 1:5 to 1:10 and having a stirrer therein, an inlet for the liquid B being arranged above an inlet for the suspension, but in the lower half of the column, an outlet for the liquid A below the inlet for the suspension and a screen arranged between the inlet for the suspension and the outlet for the liquid A.

It was surprising to the expert to find that such intensive exchange of material could be achieved in a suspension by mixing in the radial direction that the exchange of materials moving in the axial direction in counterflow to each other requires only small quantities of washing liquid. The quantity of displacing liquid can thereby be reduced to $\frac{1}{3}$ of the quantity required in known processes. This affords particular advantages if the washing liquid must subsequently be worked up. The process can easily be adjusted to optimum operating conditions due to the simple lay-out of the installation. Slight fluctuations in the solid content do not affect the result. The process may be carried out at various temperature ranges. Moreover, blockages which frequently occur particularly in the case of cotton linters do not occur in this process.

According to a further development of the process, the quantities of suspension fed in, suspension discharged, liquid fed in and liquid discharged are equal.

The quantity of liquid exchange is therefore small. This is advantageous particularly in the case of liquids which are warm and/or which must subsequently be worked up.

According to yet a further development of the process, the quantity of liquid A discharged at the bottom is greater than the quantity B fed in. In this way, washing can be accompanied by thickening of the suspension, thereby saving another stage in the process.

According to a possible further development of the process, the quantity of liquid B fed in is greater than the quantity A discharged. In this case, the process is accompanied by dilution of the suspension. This may be necessary for further processing in some cases.

The suspension treated in the process may consist of cellulose, preferably in the form of cotton linters, and water with various impurities, which is treated with displacement liquid consisting of more or less purified water.

Cotton linters have similar properties to ion exchangers and therefore hold very fast to impurities. Purification therefore requires an intense washing process of the kind afforded by the invention. Cotton linters have the additional peculiar characteristic that the fibres support each other in the direction of flow, thereby promoting the formation of liquid resistance in the direction of the column of suspension.

According to another embodiment of the process, the suspension consists of cellulose, preferably in the form of cotton linters, and water, and the liquid used for displacement is an organic acid or a mixture of various organic acids.

Since the water is displaced by acid, it is unnecessary to dry the product and then resuspend it in acids required for the next stage of the process.

In another embodiment of the process, the suspension consists of cellulose, preferably cotton linters, and water containing various impurities, and the liquid used for displacement is an organic acid or a mixture of various organic acids.

Due to the displacement of contaminated water by acids, purification is accompanied by direct preparation for the next chemical stage of the process.

An example of the invention is illustrated in the drawing and described in detail below.

A suspension is pumped into a suspension column 3 at the inlet 2 by means of a pump 1 and leaves the column 3 through the outlet 4 at the top of the column. The displacement liquid enters through the inlet 5 in the lower third of the suspension column 3. The liquids are mixed in the radial direction by the stirrer 6. The displaced liquid passes through the screen 7 to be discharged from the suspension column 3 through the outlet 8.

The suspension may be either thickened or kept at a constant concentration or diluted, according to the quantities of liquid fed in and discharged.

EXAMPLE 1

Bleached cotton linters at a solids concentration of 1% were acidified to pH 1.9 with sulphuric acid and coloured with a mixed indicator which becomes colourless in the neutral region.

The suspension was pumped at a rate of 14 liters per minute through a 130 liter suspension column in countercurrent to water. The boundary between red and colourless could be fixed at a level just below the water inlet by adjusting both the rate of inflow of water and the rate of discharge of waste liquor to approximately 14 liters per minute.

The following data were obtained:

|  | Conductivity ($\mu$S) | pH |
|---|---|---|
| Initial suspension | 6700 | 1.9 |
| Suspension in outflow | 760 | 6.8 |
| Waste Liquor | 4200 | 2.1 |
| Wash water | 730 | 6.9 |

Example 2

A suspension of linters having a solids concentration of 1 to 2%, which has been bleached in an alkaline medium, was acidified and pumped at the rate of 15 liters per minute through a suspension column as in the first example, in countercurrent to 16.5 liters per minute of water.

The washed linters had the same properties as linters produced by the conventional process although they had been washed with only ⅛ of the usual quantity of water.

The following data were obtained during the washing process:

|  | Conductivity ($\mu$S) | $P_H$ |
|---|---|---|
| Initial suspension | 10,100 | 1.9 |
| Washed suspension | 840 | 7.2 |
| Waste Liquor | 6,600 | 2.1 |
| Wash water | 810 | 7.2 |

Example 3

The experiment was carried out as in the first and second example with a throughput of substance of 12 liters per minute and a consumption of wash water of 13 liters per minute.

The results of the experiment are as follows:

|  | Conductivity ($\mu$S) | $P_H$ |
|---|---|---|
| Initial suspension | 2000 | 2.2 |
| Washed suspension | 690 | 7.5 |
| Waste liquor | 1600 | 2.4 |
| Wash water | 680 | 7.2 |

What we claim is:

1. A process for the displacement by a liquid B of a liquid A in a suspension having a solids content of from 0.5 to 20% which ascends a suspension column while being stirred, comprising feeding the liquid B into the column, at a point above the inlet for the suspension, but in the lower half of the column, discharging the displaced liquid A from the column from an outlet below the inlet for the suspension, discharging the suspension including liquid B from the column from an outlet adjacent the top of the column and providing a screen between the inlet for the suspension and the outlet for liquid A.

2. A process as claimed in claim 1, wherein the quantity of suspension fed in and discharged and the quantity of liquid fed in and discharged are equal.

3. A process as claimed in claim 1 wherein the quantity of liquid B fed in is greater than the quantity of liquid A discharged.

4. A process as claimed in claim 1, wherein the quantity of liquid B fed in is less than the quantity of liquid A discharged.

5. A process as claimed in claim 1, wherein the suspension is a suspension of cellulose in water containing impurities.

6. A process as claimed in claim 5, wherein the cellulose is in the form of cotton linters.

7. A process as claimed in claim 5, wherein the displacement liquid is water containing fewer impurities than the suspension.

8. A process as claimed in claim 5, wherein the displacement liquid is one or more organic acids.

* * * * *